United States Patent [19]
Silverberg et al.

[11] 4,206,994
[45] Jun. 10, 1980

[54] BELT TENSIONING SYSTEM

[75] Inventors: Morton Silverberg, Rochester; Ralph A. Hamaker, Penfield, both of N.Y.

[73] Assignee: Xerox Corporation, Stamford, Conn.

[21] Appl. No.: 944,235

[22] Filed: Sep. 20, 1978

[51] Int. Cl.² .................. G03G 15/00; B65H 17/32
[52] U.S. Cl. .................... 355/3 BE; 198/811; 198/841; 226/97; 355/16
[58] Field of Search ............ 355/3 R, 3 BE, 16; 198/806, 807, 811, 841; 226/97; 271/195

[56] References Cited
U.S. PATENT DOCUMENTS

| | | | |
|---|---|---|---|
| 2,891,165 | 6/1959 | Kuhrmeyer et al. | 250/65 |
| 3,702,131 | 11/1972 | Stokes et al. | 198/806 |
| 3,726,588 | 4/1973 | Moser | 355/3 BE |

FOREIGN PATENT DOCUMENTS

| | | | |
|---|---|---|---|
| 653068 | 12/1964 | Belgium | 198/811 |
| 1931209 | 4/1971 | Fed. Rep. of Germany | 198/811 |
| 43-30374 | 12/1968 | Japan | 198/811 |
| 1487985 | 10/1977 | United Kingdom | 355/3 BE |

OTHER PUBLICATIONS

Morse et al., "Web Tracking Apparatus"; Research Disclosure; May 1976, pp. 29–31.

*Primary Examiner*—Fred L. Braun
*Attorney, Agent, or Firm*—J. J. Ralabate; C. A. Green; H. Fleischer

[57] ABSTRACT

An apparatus in which an endless belt is supported for movement in a recirculating path. A pressurized fluid flows between a support post and the belt to reduce friction therebetween. The post is urged resiliently toward the belt to maintain the belt under substantially uniform tension.

10 Claims, 4 Drawing Figures

BELT TENSIONING SYSTEM

BACKGROUND OF THE INVENTION

This invention relates generally to an electrophotographic printing machine, and more particularly concerns an improved apparatus for supporting an endless belt arranged to move in a recirculating path.

In an electrophotographic printing machine, a photoconductive belt is charged to a substantially uniform potential so as to sensitize the surface thereof. The charged portion of the photoconductive belt is exposed to a light image of an original document being reproduced. Exposure of the charged photoconductive belt selectively dissipates the charge thereon in the irradiated areas. This records an electrostatic latent image on the photoconductive belt corresponding to the informational areas contained within the original document being reproduced. After the electrostatic latent image is recorded on the photoconductive belt, the latent image is developed by bringing a developer mix into contact therewith. Generally, the developer mix comprises toner particles adhering triboelectrically to carrier granules. The toner particles are attracted from the carrier granules to the latent image forming a toner powder image on the photoconductive belt. The toner powder image is then transferred from the photoconductive surface to a copy sheet. Finally, the copy sheet is heated to permanently affix the toner particles thereto in image configuration. This general approach was originally disclosed by Carlson in U.S. Pat. No. 2,297,691 and, has been further amplified and described by many related patents in the art.

Inasmuch as the photoconductive belt must be replaced periodically, it is necessary to have some technique for readily removing the belt from the printing machine. Thus, not only must the belt be easily removed by retracting one or more of the supports but, the supports must apply a substantially uniform tension to the belt during its operation. Various tensioning devices for endless belts typically distribute their loads uniformly across the width by a spring acting through a gimballed yoke. However, the cost and space allocation of such devices can become exorbitant. Moreover, since the idler roll of the device must be straddled by the yoke, the gimbal pivot frequently lies off the roller axis. The lateral forces created by the belt produce a tilting moment which, in turn, gives rise to non-uniform tension.

Accordingly, it is a primary object of the present invention to improve the system for applying a substantially uniform tension force to a photoconductive belt employed in an electrophotographic printing machine.

PRIOR ART STATEMENT

Various types of devices have hereinbefore been developed for applying a tensil force to a moving photoconductive belt. The following prior art appears to be relevant: Kuhrmeyer et al. U.S. Pat. No. 2,891,165, June 16, 1959; British Pat. No. 1,487,985 Oct. 5, 1977.

The pertinent portions of the foregoing prior art may be briefly summarized as follows:

Kuhrmeyer et al. discloses a thermocopying machine having a belt supported on a series of revolving drums. The drums are supported by a frame. A fourth drum is adjustably mounted in a support which is also supported by the frame. An adjustable support has a main clevis secured pivotably to a smaller clevis. The smaller clevis is supported rotatably on a shaft and slidably on the frame. A compression spring urges the smaller clevis toward the drum. Tension in the belt is provided by the spring.

The British patent describes a belt assembly for use in an electrophotographic reproducing apparatus. The belt assembly includes a screw for tensioning the belt. Alternatively, spring tension may be utilized for tensioning the belt.

It is believed that the scope of the present invention, as defined by the appended claims, is patentably distinguishable over the foregoing prior art taken either singly or in combination with one another.

SUMMARY OF THE INVENTION

Briefly stated and in accordance with the present invention, there is provided an apparatus for supporting an endless belt arranged to move in a recirculating path.

Pursuant to the features of the invention, the apparatus includes at least one post having the endless belt entrained thereabout. A source of pressurized fluid is in communication with the post. In this way, a fluid film is generated between the post and the belt to reduce friction therebetween. Means are provided for urging resiliently the post toward the belt. This maintains the belt under substantially uniform tension.

BRIEF DESCRIPTION OF THE DRAWINGS

Other objects and advantages of the present invention will become apparent upon reading the following detailed description and upon reference to the drawings, in which.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 1:
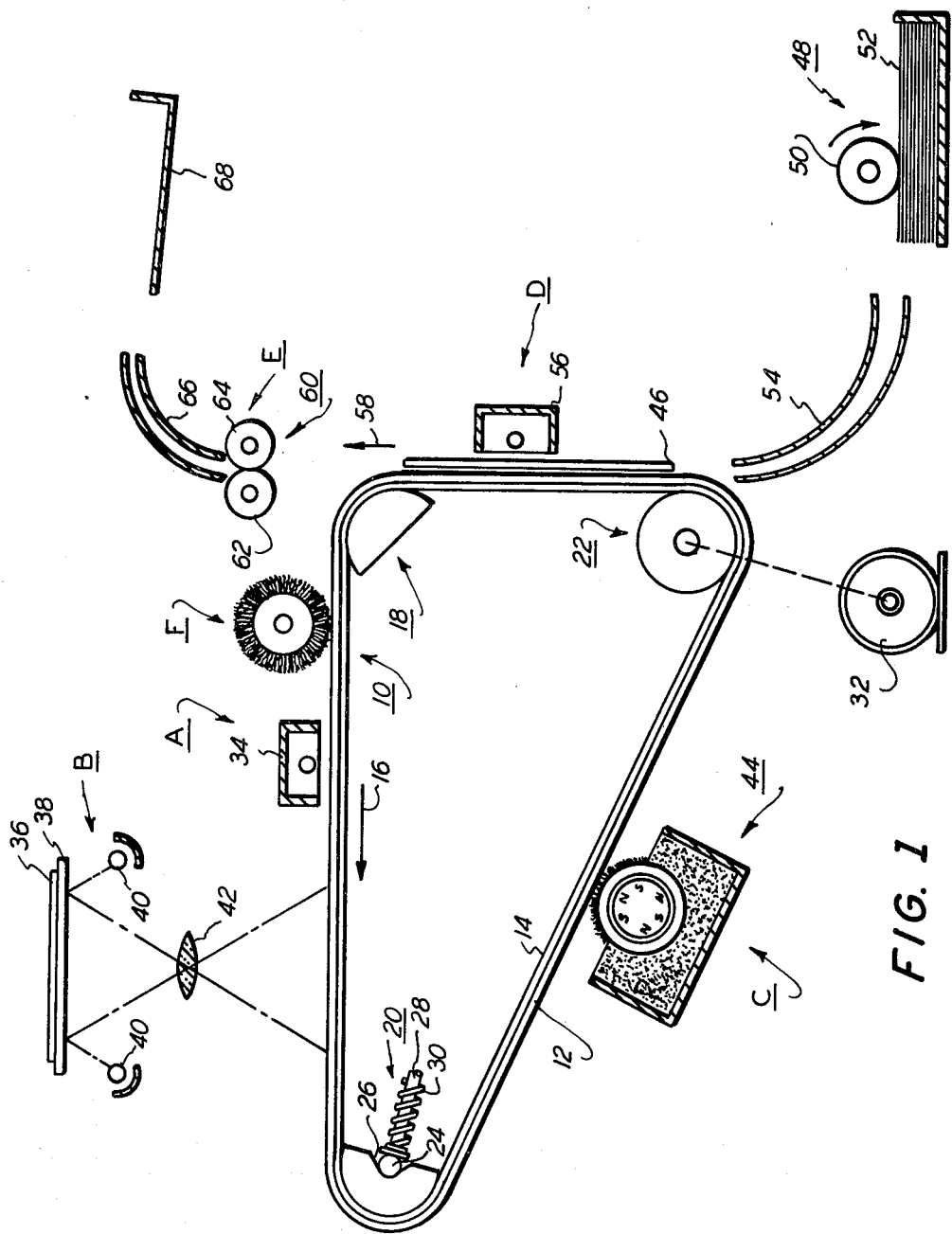
FIG. 1 is a schematic evelational view depicting an electrophotographic printing machine incorporatin the features of the present invention therein.

For a general understanding of the illustrative electrophotographic printing machine incorporating the features of the present invention therein, reference is had to the drawings. In the drawings, like reference numerals have been used throughout to designate identical elements. FIG. 1 schematically depicts the various components of the electrophotographic printing machine employing the belt support and tensioning mechanism therein. It will become evident from the following discussion that the belt support and tensioning mechanism is equally well suited for use in a wide variety of devices and is not necessarily limited in its application to the particular embodiment shown herein.

Inasmuch as the art of electrophotographic printing is well known, the various processing stations employed in the FIG. 1 printing machine will be shown hereinafter schematically and their operation described briefly with reference thereto.

As shown in FIG. 1, the electrophotographic printing machine employs a belt 10 having a photoconductive surface 12 deposited on a conductive substrate 14. Preferably, photoconductive surface 12 is made from a selenium alloy with conductive substrate 14 being made from an aluminum alloy. Belt 10 moves in the direction of arrow 16 to advance successive portions of photoconductive surface 12 sequentially through the various processing stations disposed about the path of movement thereof. Belt 10 is entrained about steering post 18, tension post assembly 20, and drive roller 22. As shown in FIG. 1, tension post assembly 20 includes a spherical member or ball 24 located in groove 26 of post 28. Ball 24 is resiliently biased into contact with groove 26 of post 20 by rod 28 and spring 30. The detailed structure of the tensioning apparatus will be described hereinafter with reference to FIGS. 2 and 3. Steering post 18 is mounted pivotably and tilts in a direction to reduce the approach angle of belt 10 to drive roller 22, i.e. the belt velocity vector relative to the normal to the drive roller axis of rotation. This restores belt 10 to the desired path of movement minimizing lateral deflection. A sensing system such as described in co-pending application Ser. No. 922,720 filed July 7, 1978, may be employed to detect lateral movement of the belt and to apply a tilting moment to steering post 18 so as to restore the belt to the desired path. Steering post 18 is adapted to pivot about an axis substantially normal to the longitudinal axis thereof. The pivot axis is substantially perpendicular to the plane defined by approaching belt 10. Drive roller 22 is in engagement with belt 10 and advances belt 10 in the direction of arrow 16. Roller 22 is rotated by motor 32 coupled thereto by suitable means such as a belt. A blower system is connected to steering post 18 and tension post 20. Both steering post 18 and tension post 29 (FIG. 4) of tension post assembly 20 have small holes in the circumferential surface thereof coupled to an interior chamber. The blower system furnishes pressurized fluid, i.e. a compressible gas, preferably air, into the interior chamber. The fluid egresses from the interior chamber through the apertures to form a fluid film between belt 10 and the respective posts, i.e. steering post 18 and tension post 29 (FIG. 4). In this manner, the fluid film at least partially supports the belt as it passes over the respective post diminishing friction therebetween. A common blower system is employed for both steering post 18 and tension post 29 (FIG. 4). The details of the fluid support system are illustrated in FIG. 4.

With continued reference to FIG. 1, initially a portion of belt 10 passes through charging station A. At charging station A, a corona generating device, indicated generally by the reference numeral 34, charges photoconductive surface 12 of belt 10 to a relatively high, substantially uniform potential. A suitable corona generating device is described in U.S. Pat. No. 2,836,725 issued to Vyverberg in 1958.

Next, the charged portion of photoconductive surface 12 is advanced through exposure station B. At exposure station B, an original document 36 is positioned face down upon transparent platen 38. Lamps 40 flash light rays onto original document 36. The light rays reflected from original document 36 are transmitted through lens 42 forming a light image thereon. The light image is projected onto the charged portion of photoconductive surface 12 so as to selectively dissipate the charge thereon. This records an electrostatic latent image on photoconductive surface 12 which corresponds to the informational areas contained within original document 36.

Thereafter, belt 10 advances the electrostatic latent image recorded on photoconductive surface 12 to development station C. At development station C, a magnetic brush developer roller 44 advances a developer mix into contact with the electrostatic latent image recorded on photoconductive surface 12 of belt 10. The developer mix comprises carrier granules and toner particles adhering triboelectrically thereto. The magnetic brush developer roller forms a chain-like array of developer mix extending in an outwardly direction therefrom. The developer mix contacts the electrostatic latent image recorded on photoconductive surface 12. The latent image attracts the toner particles from the carrier granules forming a toner powder image on photoconductive surface 12 of belt 10.

The toner powder image recorded on photoconductive surface 12 of belt 10 is then transported to transfer station D. At transfer station D, a sheet of support material 46 is positioned in contact with the toner powder image deposited on photoconductive surface 12. The sheet of support material is advanced to transfer station D by a sheet feeding apparatus 48. Preferably, sheet feeding apparatus 48 includes a feed roll 50 contacting the upper sheet of stack 52. Feed roll 50 rotates so as to advance the uppermost sheet from stack 52 into chute 54. Chute 54 directs the advancing sheet of support material into contact with photoconductive surface 12 of belt 10 in a timed sequence so that the powder image developed thereon contacts the advancing sheet of support material at transfer station D.

Transfer station D includes a corona generating device 56 which applies a spray of ions to the backside of sheet 46. This attracts the toner powder image from photoconductive surface 12 to sheet 46. After transfer, the sheet continues to moves in the direction of arrow 58 and is separated from belt 10 by a detack corona generating device (not shown) neutralizing the charge thereon causing sheet 46 to adhere to belt 10. A conveyor system (not shown) advances the sheet from belt 10 to fusing station E.

Fusing station E includes a fuser assembly, indicated generally by the reference numeral 60, which permanently affixes the transferred toner powder image to sheet 46. Preferably fuser assembly 60 includes a heated fuser roller 62 and a backup roller 64. Sheet 46 passes between fuser roller 62 and backup roller 64 with the toner power image contacting fuser roller 62. In this manner, the toner powder image is permanently affixed to sheet 46. After fusing, chute 66 guides the advancing sheet 46 to catch tray 68 for removal from the printing machine by the operator.

Invariably, after the sheet of support material is separated from photoconductive surface 12 of belt 10, some residual particles remain adhering thereto. These residual particles are removed from photoconductive surface 12 at cleaning station F. Cleaning station F includes a rotatably mounted fiberous brush in contact with photoconductive surface 12 of belt 10. The particles are cleaned from photoconductive surface 12 by the rotation of brush in contact therewith. Subsequent to cleaning, a discharge lamp (not shown) floods photoconductive surface 12 with light to dissipate any residual electrostatic latent charge remaining thereon prior to the charging thereof for the next successive imaging cycle.

It is believed that the foregoing description is sufficient for purposes of the present application to illustrate the general operation of an electrophotographic printing machine.

Figure 2:
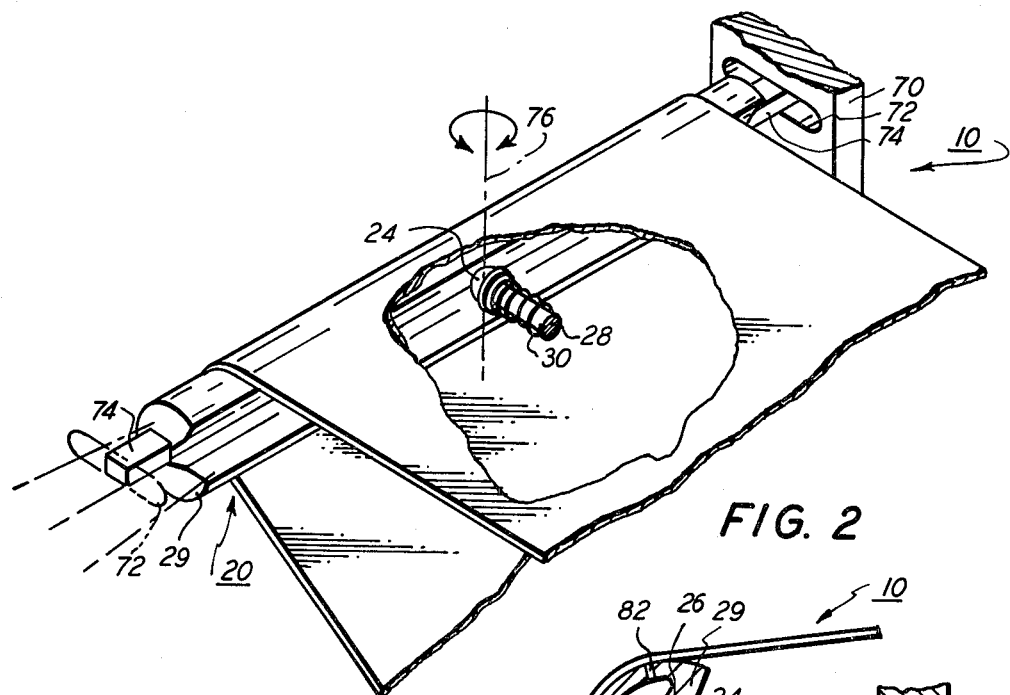
FIG. 2 is fragmentary perspective view illustrating the belt tensioning arrangement employed in the FIG. 1 printing machine.
Figure 3:
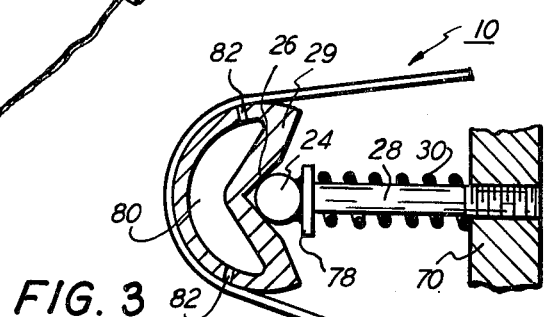
FIG. 3 is a fragmentary elevational view, partially in section, showing the FIG. 2 belt tensioning arrangement in greater detail.
Figure 4:
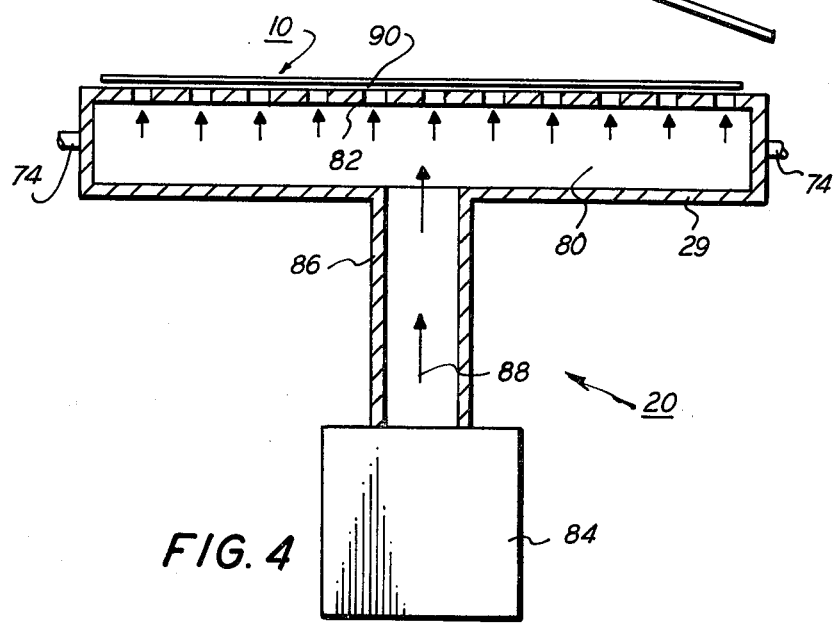
FIG. 4 is a elevational view, partially in sectioning, showing the belt support posts used in the FIG. 1 printing machine.

Referring now to the specific subject matter of the present invention, FIGS. 2 and 3 depict the belt tensioning mechanism employed in the FIG. 1 electrophotographic printing machine.

Referring now to FIGS. 2 and 3, tension post assembly 20 includes tension post 29 having groove 26 extending substantially along the longitudinal axis thereof. Groove 26, preferably, is V-shaped. As shown in FIG. 2, post 29 is cylindrical with a pie-shaped portion removed therefrom corresponding to V-groove 26 therein. Frame 70 includes slots 72 for receiving substantially rectangular end bars 74. End bars 74 are integral with the respective end portions of post 29. Slots 72 are larger than the maximum dimension of end bar 74 permitting post 29 to move slidably and to pivot therein. Thus, in operation, post 29 pivots about axis 76. Post 29 is resiliently biased toward belt 10. This is achieved by spherical member or ball 24 being pressed into groove 26 of post 29 by rod 28. Rod 28 has a generally planar surface 78 extending substantially normal to the longitudinal axis thereof in engagement with spherical member 24. The other end portion of rod 28 is mounted movably in frame 70. A helically wound coil spring 30 is interposed between frame 70 and planar surface 78. It should be noted that planar surface 78 is a flange having an outer diameter greater than the outer diameter of rod 28. Spring 30 is initially compressed so as to apply a force on flange 78, pushing rod 28 against ball 24. Ball 24 presses against rod 29 moving it toward the belt 10. In this manner, belt 10 is maintained under the desired tension. Post 29 is free to pivot about axis 76. Rod 28 is positioned substantially at the mid-point of post 29 with its longitudinal axis substantially normal to the longitudinal axis of post 29. Since there are substantially no lateral forces between belt 10 and post 29, there is no tilting moment. Hence, the belt is maintained under substantially uniform tension even during transient conditions when steering or tracking occurs. Post 29 has an interior chamber 80 adapted to receive compressed air therein. The compressed air egresses chamber 80 through apertures 82 and forms a fluid film between belt 10 and post 29 minimizing friction therebetween.

Referring now to FIG. 4, the detailed assembly of the pneumatic system associated with tension post 29 of tension post assembly 20 and the steering post 18 is depicted thereat. Inasmuch as the structure is substantially identical for steering post 18 and tension post 29, only the structure associated with tension post 29 will be described hereinafter. As shown in FIG. 4, blower 84 is coupled via conduit 86 to interior chamber 80 of post 29. Compressed air is furnished from blower 84 and moves in the direction of arrow 88 through conduit 86 into chamber 80. Post 29 includes a plurality of apertures 82 in the circumferential surface thereof substantially along the lines of tangency of belt 10 with post 29. Compressed air flows through apertures 82 into gap 90 between belt 10 and the circumferential surface of post 29. The compressed air is under pressure and supplies the supporting force for belt 10 so to at least partially space belt 10 from the circumferential surface of post 29 minimizing friction therebetween as belt 10 moves in the direction of arrow 16 (FIG. 1). Air moves in gap 90 circumferentially, i.e. in the direction of movement of belt 10 to escape to the atmosphere. Hence, the pneumatic system generates a pressurized fluid which at least partially supports belt 10 as it passes over post 29 so as to minimize friction therebetween.

In recapitulation, it is evident that the apparatus of the present invention provides a substantially friction-free pneumatic support for a belt employed in an electrophotographic printing machine while maintaining substantially uniform tension thereon. Moreover, the belt may be readily removed from the printing machine by retracting the tension applying mechanism. For example, the rod may be moved away from the belt so as to relax the force applied on the ball reducing the tension force applied to the air post permitting belt 10 to be removed from the printing machine. Hence, the tensioning system permits the ready removal of the belt from the supports while maintaining substantially uniform tension during the operation thereof.

It is, therefore, evident that there has been provided in accordance with the present invention, an apparatus for supporting and tensioning a belt employed in a electrophotographic printing machine. This apparatus fully satisfies the objects, aims, and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. An apparatus for supporting an endless belt arranged to move in a recirculating path, including:
    at least one post having the endless belt entrained thereabout;
    a source of pressurized fluid in communication with said post for generating a fluid film between said post and the belt to at least partially support the belt and reduce friction therebetween;
    means for supporting said post slidably and pivotably;
    p1 a spherical member engaging said post;
    a rod having one end portion thereof defining a generally planar surface substantially normal to the longitudinal axis of said rod and engaging said spherical member; and
    a spring urging resiliently said rod to press said spherical member against said post to maintain the belt under substantially uniform tension.

2. An apparatus as recited in claim 1, wherein said post includes a groove extending substantially parallel to the longitudinal axis thereof for receiving said spherical member therein.

3. An apparatus as recited in claim 1, wherein said post includes an interior chamber coupled to said pressurized source.

4. An apparatus as recited in claim 3, further including a second post spaced from said first mentioned post and having the belt entrained thereabout, said second post having an interior chamber coupled to said pressurized source.

5. An apparatus as recited in claim 4, further including:
    a drive roller in engagement with the belt; and
    means for rotating said drive roller to advance the belt.

6. A reproducing machine of the type wherein an endless belt arranged to have a latent image of an original document recorded thereon moves in a recirculating path through a plurality of processing stations disposed thereabout, wherein the improvement includes:
- at least one post having the endless belt entrained thereabout;
- a source of pressurized fluid in communication with said post for generating a fluid film between said post and the belt to at least partially support the belt and reduce friction therebetween;
- means for supporting said post slidably and pivotably;
- a spherical member engaging said post;
- a rod having one end portion thereof defining a generally planar surface substantially normal to the longitudinal axis of said rod and engaging said spherical member; and
- a spring urging resiliently said rod to press said spherical member against said post to maintain the belt under substantially uniform tension.

7. A reproducing machine as recited in claim 6, wherein said post includes a groove extending substantially parallel to the longitudinal axis thereof for receiving said spherical member therein.

8. A reproducing machine as recited in claim 6, wherein said post includes an interior chamber coupled to said pressurized source.

9. A reproducing machine as recited in claim 8, further including a second post spaced from said first mentioned post and having the belt entrained thereabout, said second post having an interior chamber coupled to said pressurized source.

10. A reproducing machine as recited in claim 9, further including:
- a drive roller in engagement with the belt; and
- means for rotating said drive roller to advance the belt.

* * * * *